United States Patent
Tordin et al.

(10) Patent No.: US 10,557,406 B2
(45) Date of Patent: Feb. 11, 2020

(54) SYSTEM AND METHOD FOR REGULATING COOLANT FLOW THROUGH A CHARGE AIR COOLER OF A VEHICLE

(71) Applicant: GM Global Technology Operations LLC, Detroit, MI (US)

(72) Inventors: Serena Tordin, Settimo Torinese (IT); Fabrizio Ramolivo, Canale (IT); Francesco Castorina, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 285 days.

(21) Appl. No.: 15/595,083

(22) Filed: May 15, 2017

(65) Prior Publication Data

US 2018/0328265 A1 Nov. 15, 2018

(51) Int. Cl.
*F02B 29/04* (2006.01)
*F02M 35/10* (2006.01)

(52) U.S. Cl.
CPC ...... *F02B 29/0493* (2013.01); *F02B 29/0437* (2013.01); *F02M 35/10157* (2013.01); *F02M 35/10222* (2013.01); *F02M 35/10268* (2013.01)

(58) Field of Classification Search
CPC ............. F02B 29/0437; F02B 29/0493; F02M 35/10157; F02M 35/10222; F02M 35/10268
See application file for complete search history.

(56) References Cited

U.S. PATENT DOCUMENTS

| | | | | |
|---|---|---|---|---|
| 6,321,697 B1* | 11/2001 | Matsuda | ................. | F01P 7/165 123/41.29 |
| 6,725,847 B2* | 4/2004 | Brunemann | .......... | F02D 41/005 123/568.12 |
| 7,143,580 B2* | 12/2006 | Ge | ...................... | F02B 29/0418 60/605.1 |
| 7,685,816 B2* | 3/2010 | Yabuki | .................... | F01P 7/044 60/456 |
| 8,028,569 B2* | 10/2011 | Blumendeller | ........ | F02M 26/47 73/114.68 |
| 8,136,513 B2* | 3/2012 | Schiestl | .............. | F02B 29/0418 123/435 |
| 9,394,858 B2* | 7/2016 | Richards | .............. | F02M 31/205 |
| 9,435,251 B2* | 9/2016 | Surnilla | .............. | F02D 41/0007 |
| 9,605,587 B2* | 3/2017 | Cunningham | ...... | F02B 29/0493 |
| 9,638,120 B2* | 5/2017 | Okada | .................. | F02D 41/0065 |
| 10,030,572 B2* | 7/2018 | Chekaiban | ................ | F01P 3/20 |
| 2003/0056772 A1* | 3/2003 | Borrmann | .......... | F02B 29/0443 123/563 |

(Continued)

*Primary Examiner* — Jesse S Bogue

(57) ABSTRACT

A system according to the present disclosure includes a coolant flow request module and a pump control module. The coolant flow request module is configured to determine a coolant flow request based on at least one of (i) an outlet temperature of a compressor disposed upstream of a heat exchanger of a charge air cooler, and (ii) an efficiency of a radiator of the charge air cooler. The pump control module is configured to control an output of a pump based on the coolant flow request. The pump circulates coolant through the radiator of the charge air cooler and through the heat exchanger of the charge air cooler when the pump is activated. The heat exchanger is disposed upstream of an intake manifold of an engine.

20 Claims, 4 Drawing Sheets

(56) References Cited

U.S. PATENT DOCUMENTS

2007/0199320 A1\* 8/2007 Yager .................. F02B 29/0412
60/599
2014/0372009 A1\* 12/2014 Song .................. F02D 41/0052
701/108

\* cited by examiner

SYSTEM AND METHOD FOR REGULATING COOLANT FLOW THROUGH A CHARGE AIR COOLER OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for regulating coolant flow through a charge air cooler of a vehicle.

A charge air cooler cools intake air after the intake air is compressed by a compressor and before the intake air enters an engine. A charge air cooler typically includes a heat exchanger, a radiator, and a pump. Intake air passes through the heat exchanger as the intake air flows from the compressor to the engine. Coolant flowing through the heat exchanger absorbs heat from the intake air passing through the heat exchanger.

The radiator receives coolant from the heat exchanger after the coolant has absorbed heat from the intake air passing through the heat exchanger. The radiator typically includes a fan that blows air past the heated coolant to decrease the temperature of the coolant before the coolant is returned to the heat exchanger. The pump circulates coolant through the heat exchanger and the radiator.

SUMMARY

A system according to the present disclosure includes a coolant flow request module and a pump control module. The coolant flow request module is configured to determine a coolant flow request based on at least one of (i) an outlet temperature of a compressor disposed upstream of a heat exchanger of a charge air cooler, and (ii) an efficiency of a radiator of the charge air cooler. The pump control module is configured to control an output of a pump based on the coolant flow request. The pump circulates coolant through the radiator of the charge air cooler and through the heat exchanger of the charge air cooler when the pump is activated. The heat exchanger is disposed upstream of an intake manifold of an engine In one aspect, the system further includes a minimum coolant flow module configured to determine a minimum coolant flow through the heat exchanger that prevents boiling, where the coolant flow request module sets the coolant flow request equal to the minimum coolant flow when the coolant flow request is less than the minimum coolant flow.

In one aspect, the minimum coolant flow module is configured to determine the minimum coolant flow based on the outlet temperature of the compressor and a total mass flow rate of air and recirculated exhaust gas entering the compressor.

In one aspect, the system further includes a maximum coolant flow module configured to determine a maximum coolant flow that avoids condensation in the charge air cooler, where the coolant flow request module sets the coolant flow request equal to the maximum coolant flow when the coolant flow request is greater than the maximum coolant flow.

In one aspect, the maximum coolant flow module is configured to determine the maximum coolant flow based on the efficiency of the radiator and a total mass flow rate of air and recirculated exhaust gas entering the compressor.

In one aspect, the system further includes a radiator efficiency module configured to determine the efficiency of the radiator based on the outlet temperature of the compressor, an inlet specific humidity of the compressor, a boost pressure provided by the compressor, and an outside air temperature.

In one aspect, the coolant flow request module is configured to set the maximum coolant flow equal to the minimum coolant flow when the minimum coolant flow is greater than the maximum coolant flow.

In one aspect, before comparing the coolant flow request to the minimum and maximum coolant flows, the coolant flow request module is configured to determine the coolant flow request based on a boost pressure provided by the compressor, a total mass flow rate of air and recirculated exhaust gas entering the compressor, an ambient pressure, a temperature of the intake manifold, and an outside air temperature.

In one aspect, the coolant flow request module is configured to selectively set the coolant flow request equal to zero when the engine is running, and the pump control module is configured to deactivate the pump when the coolant flow request is equal to zero.

In one aspect, based on the coolant flow request, the pump control module is configured to adjust the output of the pump to one of at least three values that are greater than zero.

A method according to the present disclosure includes determining a coolant flow request based on at least one of (i) an outlet temperature of a compressor disposed upstream of a heat exchanger of a charge air cooler, and (ii) an efficiency of a radiator of the charge air cooler. The method further includes controlling an output of a pump based on the coolant flow request. The pump circulates coolant through the radiator of the charge air cooler and through the heat exchanger of the charge air cooler when the pump is activated. The heat exchanger is disposed upstream of an intake manifold of an engine.

In one aspect, the method further includes determining a minimum coolant flow through the heat exchanger that prevents boiling, and setting the coolant flow request equal to the minimum coolant flow when the coolant flow request is less than the minimum coolant flow.

In one aspect, the method further includes determining the minimum coolant flow based on the outlet temperature of the compressor and a total mass flow rate of air and recirculated exhaust gas entering the compressor.

In one aspect, the method further includes determining a maximum coolant flow that avoids condensation in the charge air cooler, and setting the coolant flow request equal to the maximum coolant flow when the coolant flow request is greater than the maximum coolant flow.

In one aspect, the method further includes determining the maximum coolant flow based on the efficiency of the radiator and a total mass flow rate of air and recirculated exhaust gas entering the compressor.

In one aspect, the method further includes determining the efficiency of the radiator based on the outlet temperature of the compressor, an inlet specific humidity of the compressor, a boost pressure provided by the compressor, and an outside air temperature.

In one aspect, the method further includes setting the maximum coolant flow equal to the minimum coolant flow when the minimum coolant flow is greater than the maximum coolant flow.

In one aspect, the method further includes, before comparing the coolant flow request to the minimum and maximum coolant flows, determining the coolant flow request based on a boost pressure provided by the compressor, a total mass flow rate of air and recirculated exhaust gas entering the compressor, an ambient pressure, a temperature of the intake manifold, and an outside air temperature.

In one aspect, the method further includes selectively setting the coolant flow request equal to zero when the engine is running, and deactivating the pump when the coolant flow request is equal to zero.

In one aspect, the method further includes adjusting the output of the pump to one of at least three values that are greater than zero.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
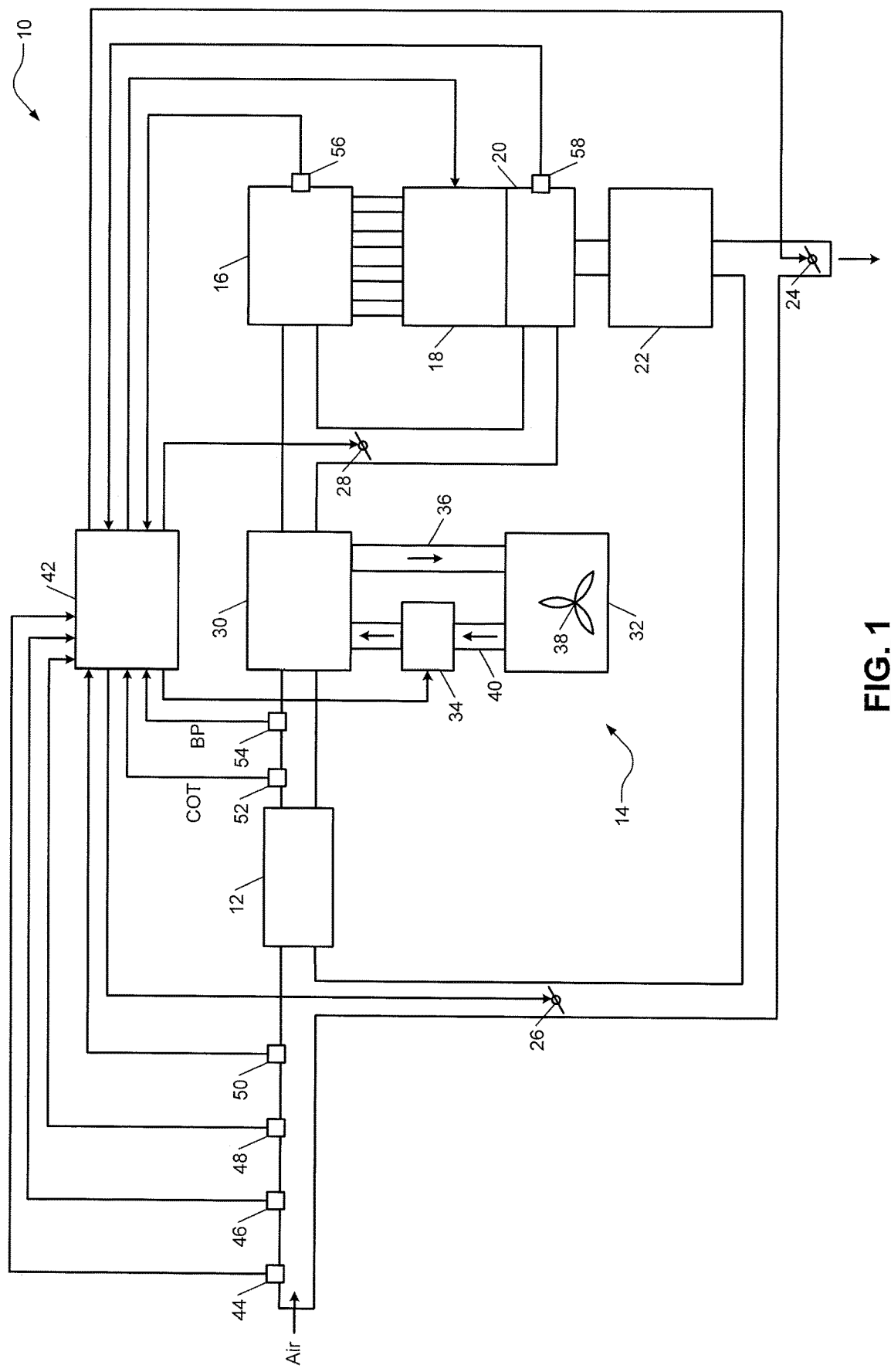
FIG. 1 is a functional block diagram of an example vehicle system according to the principles of the present disclosure.

As discussed above, a charge air cooler typically includes a heat exchanger, a radiator, and a pump. The rate of coolant flow through the charge air cooler is controlled by adjusting the output of the pump. If the rate of coolant flow through the heat exchanger is too low, hot intake air passing through the heat exchanger may cause the coolant to boil or cause an excessive thermal gradient in coolant flowing through the heat exchanger. The risk of coolant boiling may be greater for heat exchangers having countercurrent designs (where coolant flows in opposite direction than air) relative to heat exchangers having co-current designs (where coolant flows in same direction as air). Coolant boiling may cause damage to the pump, and an excessive thermal gradient in coolant flowing through the heat exchanger may cause a fatigue crack in the heat exchanger.

If the rate of coolant flow through the heat exchanger is too high, condensation may form within an intake air passage in the heat exchanger and/or downstream of the heat exchanger. In some cases, intake air is mixed with recirculated exhaust gas before the intake air is passed through the heat exchanger. Since the recirculated exhaust gas may contain nitrogen oxide, any condensation that forms in or downstream of the heat exchanger due to high coolant flow may be an acid vapor condensation. The presence of acid vapor condensate in the heat exchanger promotes corrosion of the heat exchanger. In addition, since the engine is not typically calibrated for the presence of acid condensate in the combustion mixture, the presence of acid condensate in the combustion mixture may adversely affect engine performance and emissions.

Some coolant flow control systems adjust the output of the pump based on the rate of intake airflow entering the heat exchanger and the boost pressure provided by a compressor disposed upstream of the heat exchanger. In one example, a coolant flow request is determined based on the intake airflow rate and the boost pressure, and the output of the pump is adjusted to satisfy the coolant flow request. Typically, the output of the pump is switched between two levels (e.g., speeds, duty cycles) to yield two rates of coolant flow through the charge air cooler. While the pump is not typically switched off while the engine is running to avoid the risk of coolant boiling or an excessive thermal gradient across the heat exchanger, existing coolant flow control systems do not account for the risk of condensation.

A system and method according to the present disclosure controls coolant flow through a charge air cooler in a way that not only avoids the risks of coolant boiling and an excessive thermal gradient, but also avoids the risk of condensation forming in or downstream of the charge air cooler. The system and method accomplishes this by determining a minimum rate of coolant flow through the charge air cooler that avoids an excessive coolant temperature, and a maximum rate of coolant flow through the charge air cooler that avoids condensation. The system and method sets the coolant flow request to the minimum coolant flow rate when the coolant flow request is less than the minimum coolant flow rate. Similarly, the system and method sets the coolant flow request to the maximum coolant flow rate when the coolant flow request is greater than the maximum coolant flow rate.

By avoiding the risk of coolant boiling, the system and method prevents damage to the pump. By avoiding the risk of an excessive thermal gradient across the heat exchanger, the system and method prevents damage to the heat exchanger. By avoiding the risk of condensation forming in or downstream of the charge air cooler, the system and method prevents corrosion of the heat exchanger and prevents degradations in engine performance and emissions. In addition, since the system and method determines the maximum coolant flow rate, the system and method has the ability to switch off the pump when the engine is running to improve fuel economy while still avoiding the risk of coolant boiling. In one example, when the coolant flow request is zero, the system and method switches off the pump while the engine is running if the minimum coolant flow rate is also zero.

Referring now to FIG. 1, a vehicle system 10 includes a compressor 12, a charge air cooler 14, an intake manifold 16, an engine 18, an exhaust manifold 20, a diesel particulate filter 22, an exhaust throttle valve 24, a low-pressure (LP) exhaust gas recirculation (EGR) throttle valve 26, and a high-pressure (HP) EGR throttle valve 28. The compressor 12 receives a mixture of outside air and exhaust gas recirculated through the LP EGR throttle valve 26. The compressor 12 pressurizes this mixture of outside air and exhaust gas. The compressor 12 may be part of a turbocharger.

The charge air cooler 14 includes a heat exchanger 30, a radiator 32, and a pump 34. The heat exchanger 30 receives the pressurized mixture of air and exhaust gas from the compressor 12 and decreases the temperature of the pressurized mixture. Coolant flowing through the heat exchanger 30 absorbs heat from the pressurized mixture of air and exhaust gas. The heat exchanger 30 may have a countercurrent design where coolant flows through the heat exchanger 30 in an opposite direction than the direction in which the mixture of air and exhaust gas flows through the heat exchanger 30.

The radiator 32 receives coolant from the heat exchanger 30 through a coolant return line 36 after the coolant has absorbed heat from the pressurized mixture of air and exhaust gas passing through the heat exchanger 30. The radiator 32 includes a fan 38 that blows air past the heated coolant to decrease the temperature of the coolant. The pump 34 circulates coolant through the heat exchanger 30 and the radiator 32. In the example shown, the pump 34 is disposed in a coolant supply line 40 that supplies cooled coolant from the radiator 32 to the heat exchanger 30. However, the pump 34 may be disposed in the coolant return line 36. The pump 34 may be an electric pump.

After the heat exchanger 30 decreases the temperature of the mixture of air and exhaust gas, the mixture is mixed with exhaust gas recirculated through the HP EGR throttle valve 28 before entering the intake manifold 16. The engine 18 draws air and exhaust gas from the intake manifold 16, injects fuel into the mixture, and combusts the mixture of air, exhaust gas, and fuel to produce drive torque. The engine 14 may be a spark-ignition engine or a compression-ignition engine. The exhaust manifold 20 receives exhaust expelled from the engine 18.

The diesel particular filter 22 extracts particular matter from the exhaust gas. The exhaust throttle valve 24 regulates the flow of exhaust gas from the diesel particular filter 22 through the outside environment. The LP EGR throttle valve 26 regulates the flow of exhaust gas from the diesel particular filter 22 to the compressor 12. The HP EGR throttle valve 28 regulates the flow of the exhaust gas from the exhaust manifold 22 the intake manifold 16.

A vehicle control module (VCM) 42 controls the engine 18, the exhaust throttle valve 24, the LP EGR throttle valve 26, the HP EGR throttle valve 28, and the pump 34 based on one or more vehicle operating conditions. The vehicle operating conditions may be measured using one or more sensors. The sensors may include an outside air temperature (OAT) sensor 44, an outside air pressure (OAP) sensor 46, outside air humidity (OAH) sensor 48, a mass airflow (MAF) sensor 50, a compressor outlet temperature (COT) sensor 52, a boost pressure (BP) sensor 54, an intake manifold temperature (IMT) sensor 56, and/or an exhaust manifold temperature (EMT) sensor 58.

The OAT sensor 44 measures the temperature of outside air entering the compressor 12. The OAP sensor 46 measures the pressure of outside air entering the compressor 12. The OAH sensor 48 measures the humidity of outside air entering the compressor 12. The MAF sensor 50 measures the mass flow rate of outside air entering the compressor 12.

The COT sensor 52 measures the temperature of the mixture of air and exhaust gas at an outlet of the compressor 12. The COT sensor 52 may be disposed at the outlet of the compressor 12. Alternatively, the COT sensor 52 may be disposed at a location downstream of the compressor 12 and upstream of the heat exchanger 30, as shown.

The BP sensor 54 measures the boost pressure provided by the compressor 12. In other words, the BP sensor 54 measures the pressure of the mixture of air and exhaust gas pressurized by the compressor 12. The IMT sensor 56 measures the temperature of air and exhaust gas flowing through the intake manifold 16. The EMT sensor 58 measures the temperature of exhaust gas flowing through the exhaust manifold 16.

Figure 2:
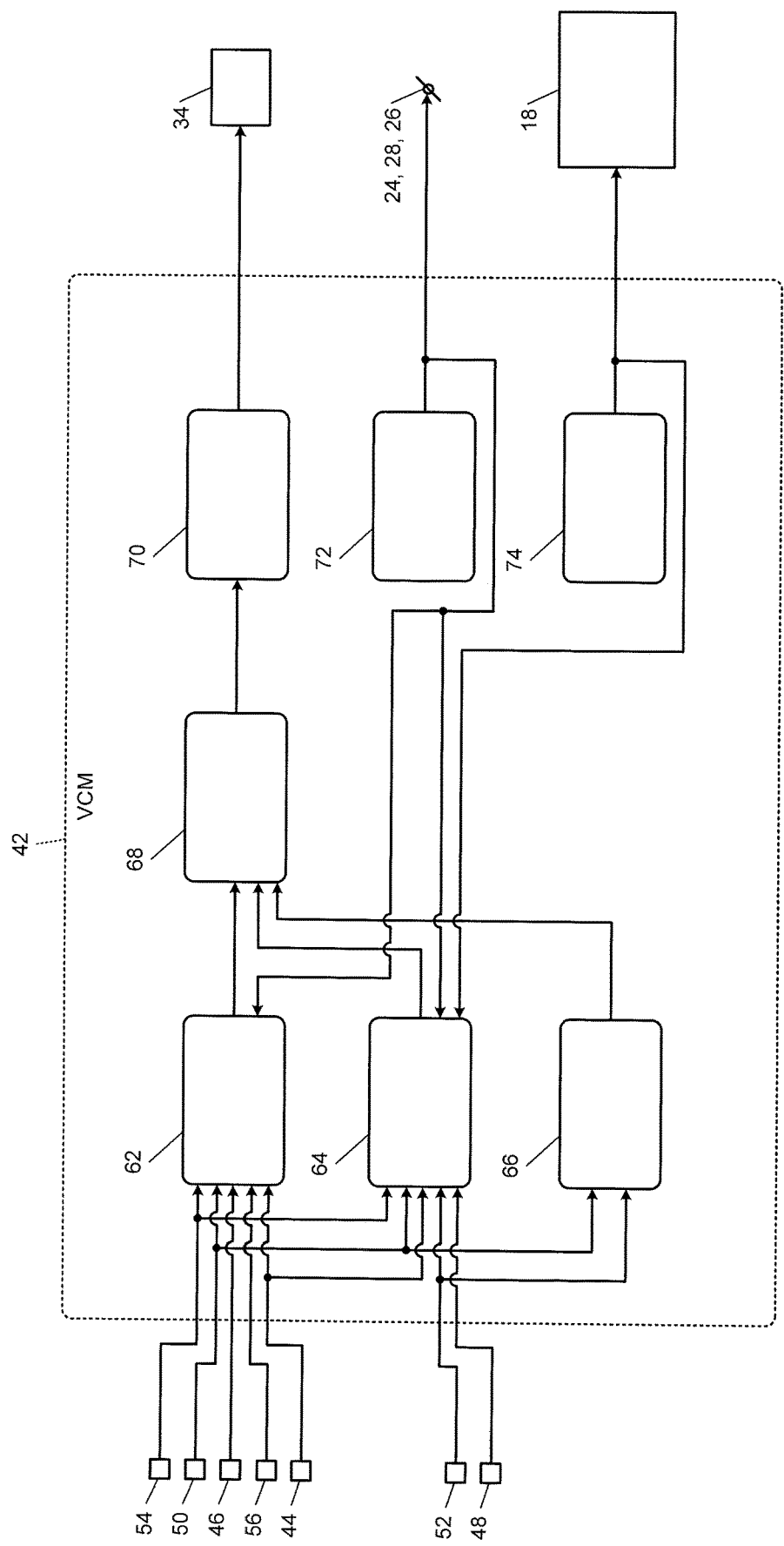
FIG. 2 is a functional block diagram of an example control system according to the principles of the present disclosure.

Referring now to FIG. 2, an example implementation of the VCM 42 includes an initial coolant flow request module 62, a maximum coolant flow module 64, a minimum coolant flow module 66, and a final coolant flow request module 68. The initial coolant flow request module 62 determines an initial coolant flow request and outputs the initial coolant flow request. The initial coolant flow request module 62 may determine the initial coolant flow request based on the boost pressure from the BP sensor 54, the mass flowrate of intake air from the MAF sensor 50, the outside air pressure from the OAP sensor 46, the intake manifold temperature from the IMT sensor 56, and/or the outside air temperature from the OAT sensor 44.

In one example, the initial coolant flow request module 62 determines a base coolant flow request based on the boost pressure and a total mass flowrate of air and exhaust gas entering the heat exchanger 30, and adjusts the base coolant flow request based on other vehicle operating conditions to yield the initial coolant flow request. The initial coolant flow request module 62 may determine a sum of the mass flowrate of intake air from the MAF sensor 50 and a mass flowrate of exhaust gas recirculated through the LP EGR throttle valve 26 to obtain set the total mass flowrate of air and exhaust gas. The initial coolant flow request module 62 may estimate the mass flowrate of exhaust gas recirculated through the LP EGR throttle valve 26 based on the positions of the exhaust throttle valve 24 and the LP EGR throttle valve 26.

The initial coolant flow request module 62 may adjust the initial coolant flow request based on the outside air pressure from the OAP sensor 46. In one example, the initial coolant flow request module 62 multiplies the base coolant flow request by a first correction factor to yield a first coolant flow request. The initial coolant flow request module 62 may determine the first correction factor based on the outside air pressure using, for example, a function or mapping (e.g., a lookup table).

The initial coolant flow request module 62 may adjust the initial coolant flow request based on the intake manifold temperature from the IMT sensor 56. In one example, the initial coolant flow request module 62 determines a sum of the first coolant flow request and a second correction factor to obtain a second coolant flow request. The initial coolant flow request module 62 may determine the second correction factor based on the intake manifold temperature using, for example, a function or mapping.

The initial coolant flow request module 62 may adjust the initial coolant flow request based on the outside air temperature from the OAT sensor 44. In one example, the initial coolant flow request module 62 multiplies the second coolant flow request by a third correction factor to obtain a third coolant flow request. The initial coolant flow request module 62 may determine the third correction factor based on the outside air temperature using, for example, a function or mapping. The initial coolant flow request that is output by the initial coolant flow request module 62 may be equal to the third coolant flow request.

The maximum coolant flow module 64 determines a maximum coolant flow through the charge air cooler 14 and outputs the maximum coolant flow. The maximum coolant flow is the maximum allowable rate of coolant flow through the charge air cooler 14 that avoids condensation inside or downstream of the charge air cooler 14. The maximum coolant flow module 64 may determine the maximum coolant flow based on the total mass flow rate of air and exhaust gas entering the heat exchanger 30 and a maximum efficiency of the charge air cooler 14 using, for example, a function or mapping. The maximum coolant flow module 64 may receive the total mass flowrate from the initial coolant flow request module 62. Alternatively, the maximum coolant flow module 64 may determine the total mass flowrate in the manner described above.

The maximum coolant flow module 64 may determine the maximum efficiency of the charge air cooler 14 based on the compressor outlet temperature from the COT sensor 54, a humidity of air and exhaust gas at the inlet of the compressor 12, the boost pressure from the BP sensor 54, and the outside air temperature from the OAT sensor 44. The maximum coolant flow module 64 may determine the humidity of air and exhaust gas at the inlet of the compressor 12 based on the mass flow rate of intake air from the MAF sensor 50, the outside air humidity from the OAH sensor, the mass flowrate of exhaust gas recirculated through the LP EGR throttle valve 26, and the humidity of exhaust gas recirculated through the LP EGR throttle valve 26 using, for example, a function or mapping.

The maximum coolant flow module 64 may estimate the mass flowrate of exhaust gas recirculated through the LP EGR throttle valve 26 based on the positions of the exhaust throttle valve 24 and the LP EGR throttle valve 26. The maximum coolant flow module 64 may estimate the humidity of exhaust gas recirculated through the LP EGR throttle valve 26 based on the rate of fuel injected into the engine 18. For example, the estimated humidity of exhaust gas recirculated through the LP EGR throttle valve 26 may be increased at the fuel injection rate increases and vice versa.

In one example, the maximum coolant flow module 64 determines a saturated vapor temperature at the outlet of the compressor 12 based on the boost pressure and the compressor inlet humidity using, for example, a function or mapping. The maximum coolant flow module 64 then determines the maximum efficiency of the charge air cooler 14 based on the compressor outlet temperature, the saturated vapor temperature, and the outside air temperature using a relationship such as $$Eff_{MAX\_CAC} = \frac{COT - SVT}{COT - OAT} \quad (1)$$

where $Eff_{MAX\_CAC}$ is the maximum efficiency of the charge air cooler 14, SVT is the saturated vapor temperature, COT is the compressor outlet temperature, and OAT is the outside air temperature.

The saturated vapor temperature is a temperature that may not be exceeded to avoid condensation inside or downstream of the charge air cooler 14. In one example, the maximum coolant flow module 64 determines a saturated vapor pressure based on the boost pressure and the compressor inlet humidity using, for example, a function or mapping. The maximum coolant flow module 64 then converts the saturated vapor pressure into the saturated vapor temperature.

The minimum coolant flow module 66 determines a minimum coolant flow through the charge air cooler 14 and outputs the minimum coolant flow. The minimum coolant flow is a minimum allowable rate of coolant flow through the heat exchanger 30 that prevents the coolant from boiling in the heat exchanger 30 and/or ensures that the coolant does not exceed a maximum thermal gradient. The coolant may exceed the maximum thermal gradient when the difference between the temperature of coolant entering the heat exchanger 30 and the temperature of coolant exiting the heat exchanger 30 is greater than a threshold (e.g., a predetermined value).

The minimum coolant flow module 66 may determine the minimum coolant flow based on the compressor outlet temperature from the COT sensor 52 and the total mass flow rate of air and exhaust gas recirculated through the LP EGR throttle valve 26 using, for example, a function or mapping. The mapping may be calibrated at worst case ambient conditions for coolant boiling and/or maximum thermal gradient occurrences. For example, the mapping may be calibrated in cold ambient temperatures corresponding to winter conditions when the charge air cooler 14 requires less coolant flow to cool the air and exhaust gas by a target amount.

The final coolant flow request module 68 determines a final coolant flow request based on the initial coolant flow request, the maximum coolant flow, and the minimum coolant flow. The final coolant flow request module 68 compares the initial coolant flow request to the maximum coolant flow and sets (or limits) the initial coolant flow request to the maximum coolant flow when the initial coolant flow is greater than the maximum coolant flow. For example, if the initial coolant flow request is 4 liters per minute (L/min) and the maximum coolant flow request is 3 L/min, the final coolant flow request module 68 adjusts the initial coolant flow request from 4 L/min to 3 L/min. The final coolant flow request module 68 sets (or limits) the initial coolant flow request to the minimum coolant flow when the initial coolant flow is less than the maximum coolant flow. For example, if the initial coolant flow request is 1 L/min and the minimum coolant flow request is 2 L/min, the final coolant flow request module 68 adjusts the initial coolant flow request from 1 L/min to 2 L/min.

Before comparing the initial coolant flow request to the maximum or minimum coolant flow, the final coolant flow request module 68 may compare the maximum coolant flow to the minimum coolant flow. If the maximum coolant flow is less than the minimum coolant flow, the final coolant flow request module 68 may set the maximum coolant flow to the minimum coolant flow to ensure that the minimum coolant flow takes priority in the event that there is a conflict between these two values. For example, if the maximum coolant flow is 1 L/min and the minimum coolant flow is 2 L/min, the final coolant flow request module 68 adjusts the maximum coolant flow from 1 L/min to 2 L/min. As a result, the maximum and minimum coolant flow may have the same value, and therefore the final coolant flow request module 68 may also adjust the initial coolant flow request to have this value if the initial coolant flow request does not already have the same value.

After comparing the initial coolant flow request to the maximum and minimum coolant flows and selectively adjusting the initial coolant flow request as discussed above, the final coolant flow request module 68 outputs the initial coolant flow request as adjusted. The adjusted initial coolant flow request that is output by the final coolant flow request module 68 may be referred to as the final coolant flow request.

The example implementation of the VCM 42 shown in FIG. 2 further includes a pump control module 70, a throttle control module 72, and an engine control module 74. The pump control module 70 controls the output of the pump 34 based on the final coolant flow request using, for example, a function or mapping that relates the final coolant flow request to a target duty cycle or speed of the pump 34. The throttle control module 72 controls the positions of the exhaust throttle valve 24, the LP EGR throttle valve 26, and the HP EGR throttle valve 28 based on one or more vehicle operating conditions using, for example, a function or mapping. The throttle control module 72 may also output target and/or measured positions of the exhaust throttle valve 24 and the LP EGR throttle valve 26 for use in determining the mass flow rate of exhaust gas recirculated through the LP EGR throttle valve 26.

The engine control module 74 controls the engine 18 based on one or more vehicle operating conditions using, for example, a function or mapping. For example, the engine control module 74 may output a target throttle position to control a throttle valve of the engine 18, output a target fuel injection rate and/or a target fuel injection timing to control a fuel injector of the engine 18, and/or output a target spark timing to control a spark plug of the engine 18. The maximum coolant flow module 64 may use the target fuel injection rate to estimate the humidity of exhaust gas recirculated through the LP EGR throttle valve 26 as discussed above.

Figure 3:
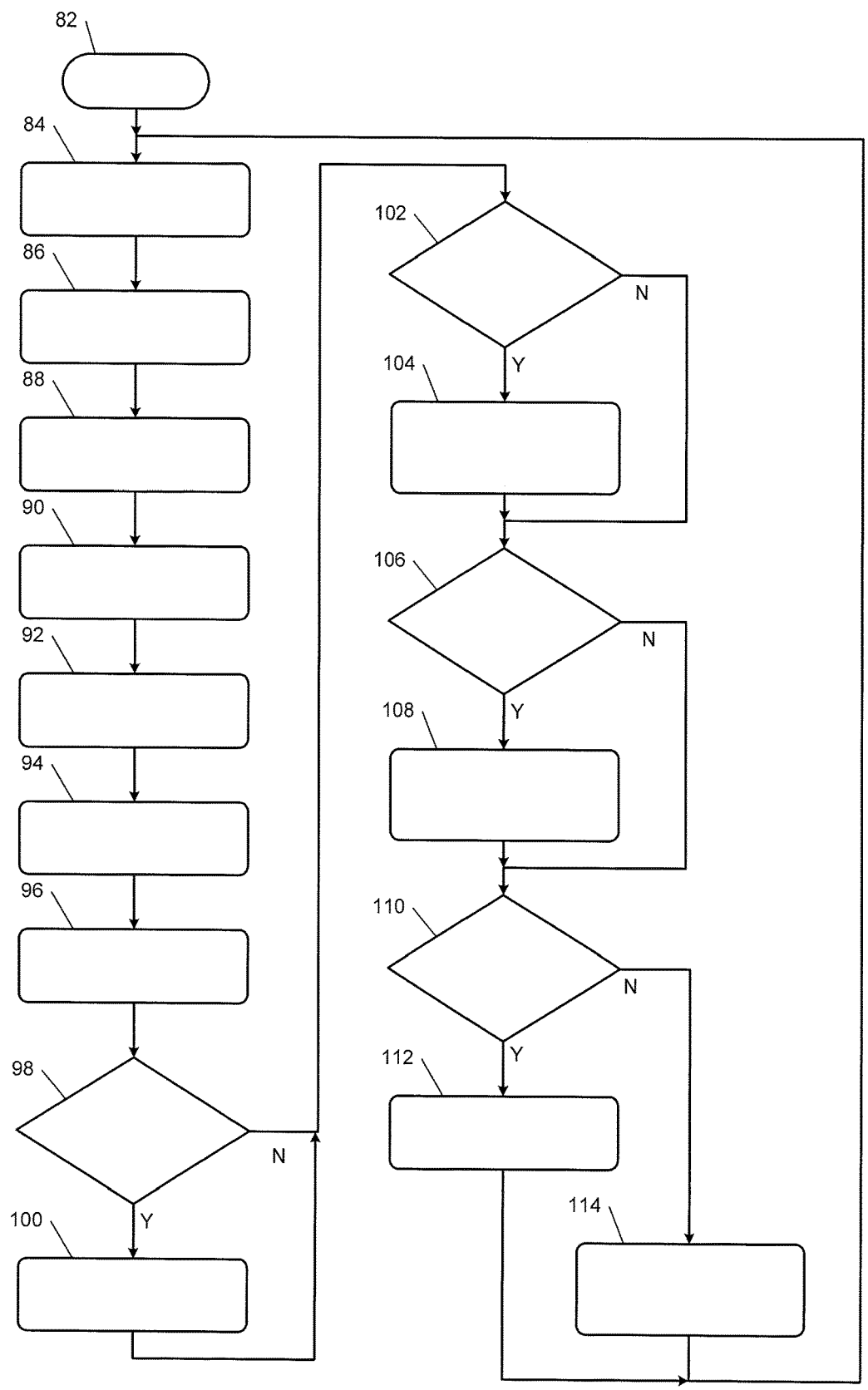
FIG. 3 is a flowchart illustrating an example control method according to the principles of the present disclosure.

Referring now to FIG. 3, a method for regulating coolant flow through the charge air cooler 14 begins at 82. The method is described in the context of the modules of FIG. 2. However, the particular modules that perform the steps of the method may be different than the modules mentioned below, or the method may be implemented apart from the modules of FIG. 2.

At 84, the initial coolant flow request module 62 determines the base coolant flow request. At 86, the initial coolant flow request module 62 applies an ambient pressure correction to the base coolant flow request. For example, the initial coolant flow request module 62 may adjust the base coolant flow request based on the outside air pressure to yield the first coolant flow request as discussed above.

At 88, the initial coolant flow request module 62 applies an intake manifold temperature correction to the base coolant flow request. For example, the initial coolant flow request module 62 may adjust the first coolant flow request based on the intake manifold temperature to yield the second coolant flow request as discussed above. At 90, the initial coolant flow request module 62 applies an outside air temperature correction to the base coolant flow request. For example, the initial coolant flow request module 62 may adjust the second coolant flow request based on the outside air temperature to yield the third coolant flow request as discussed above. The initial coolant flow request module 62 may set the initial coolant flow request equal to the third coolant flow request and then output the initial coolant flow request to the final coolant flow request module 68.

At 92, the maximum coolant flow module 64 determines the maximum efficiency of the charge air cooler 14. For example, the maximum coolant flow module 64 may determine the maximum efficiency of the charge air cooler 14 based on the compressor outlet temperature, the saturated vapor temperature, and the outside air temperature using relationship (1) as discussed above. At 94, the maximum coolant flow module 64 determines the maximum coolant flow through the charge air cooler 14. For example, the maximum coolant flow module 64 may determine the maximum coolant flow based on the total mass flow rate of air and exhaust gas entering the heat exchanger 30 and the maximum efficiency of the charge air cooler 14 as discussed above. The maximum coolant flow module 64 may output the maximum coolant flow to the final coolant flow request module 68.

At 96, the minimum coolant flow module 66 determines the minimum coolant flow through the charge air cooler 14. For example, the minimum coolant flow module 66 may determine the minimum coolant flow based on the compressor outlet temperature and the total mass flow rate of air and exhaust gas recirculated through the LP EGR throttle valve 26 as discussed above. The minimum coolant flow module 66 may output the minimum coolant flow to the final coolant flow request module 68.

At 98, the final coolant flow request module 68 determines whether the minimum coolant flow is greater than the maximum coolant flow. If the minimum coolant flow is greater than the maximum coolant flow, the method continues at 100 before continuing to 102. Otherwise, the method continues directly at 102. At 100, the final coolant flow request module 68 sets the maximum coolant flow equal to the minimum coolant flow.

At 102, the final coolant flow request module 68 determines whether the initial coolant flow request received from the initial coolant flow request module 62 is greater than the maximum coolant flow. If the initial coolant flow request is greater than the maximum coolant flow, the method continues at 104 before continuing to 106. Otherwise, the method continues directly at 106. At 104, the final coolant flow request module 68 sets the initial coolant flow request equal to the maximum coolant flow.

At 106, the final coolant flow request module 68 determines whether the initial coolant flow request received from the initial coolant flow request module 62 is less than the minimum coolant flow. If the initial coolant flow request is greater than the minimum coolant flow, the method continues at 108 before continuing to 110. Otherwise, the method continues directly at 110. At 108, the final coolant flow request module 68 sets the initial coolant flow request equal to the minimum coolant flow.

After comparing the initial coolant flow request to the minimum and maximum coolant flows and/or adjusting the initial coolant flow request based thereon, the final coolant flow request module 68 may set the final coolant flow request equal to initial coolant flow request. Thus, if the method determines at 102 that the initial coolant flow request is greater than the maximum coolant flow, the final coolant flow request module 68 may ultimately set the final coolant flow request equal to the maximum coolant flow. Similarly, if the method determines at 106 that the initial coolant flow request is less than the minimum coolant flow, the final coolant flow request module 68 may ultimately set the final coolant flow request equal to the minimum coolant flow. On the other hand, if the initial coolant flow request is less than the maximum coolant flow and greater than the minimum coolant flow, the final coolant flow request module 68 may simply set the final coolant flow request equal to the unadjusted value of the initial coolant flow request (i.e., the value of the initial coolant flow request as received from the initial coolant flow request module 62).

At 110, the pump control module 70 determines whether the final coolant flow request is equal to zero. If the final coolant flow request is equal to zero, the method continues at 112 and the pump control module 70 deactivates the pump 34. Otherwise, the method continues at 114 and the pump control module 70 adjusts the output of the pump 34 based on the final coolant flow request.

The pump control module 70 may adjust the output of the pump 34 based on the final coolant flow request using a function or mapping that relates coolant flow to pump output (e.g., pump speed, pump duty cycle). The function or mapping may relate at least three (e.g., 3 to 100) values of coolant flow to at least three (e.g., 3 to 100) corresponding values of pump output that are greater than zero. Thus, when adjusting the output of the pump 34 based on the final coolant flow request, the pump control module 70 may adjust the output of the pump 34 to one of at least three values that are greater than zero.

Figure 4:
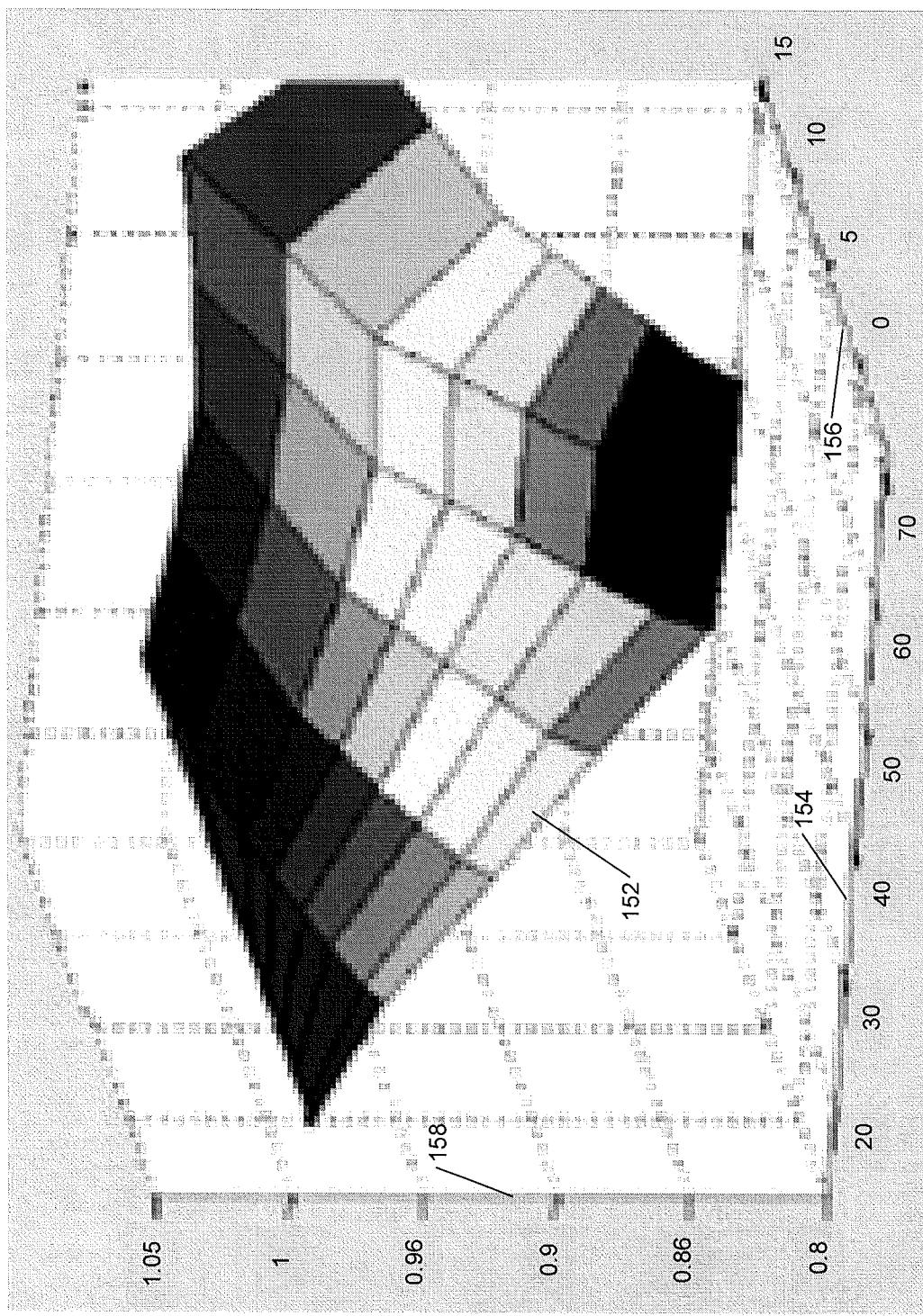
FIG. 4 is a graph illustrating an example relationship between an efficiency of a charge air cooler, an amount of air and recirculated exhaust gas flowing through the charge air cooler, and a maximum coolant flow through the charge air cooler.

FIG. 4 is a graph illustrating an example of a function or mapping 152 that may be stored in the maximum coolant flow module 64 and used by the maximum coolant flow module 64 to determine the maximum coolant flow through the charge air cooler 14. The graph has an x-axis 154, a y-axis 156, and a z-axis 158. The x-axis 154 represents the total mass flow rate of air and exhaust gas entering the heat exchanger 30 in grams per second (g/s). The y-axis 156 represents the maximum coolant flow through the charge air cooler 14 in L/min. The z-axis 158 represents the maximum efficiency of the charge air cooler 14 divided by 100 (i.e., a value of 1 on the z-axis 156 corresponds to a maximum efficiency of 100 percent).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a charge air cooler (CAC) efficiency module configured to determine a maximum efficiency of a charge air cooler that avoids condensation in the charge air cooler;
a coolant flow request module configured to determine a coolant flow request based on:
an outlet temperature of a compressor disposed upstream of a heat exchanger of the charge air cooler; and
the maximum efficiency of the charge air cooler; and
a pump control module configured to control an output of a pump based on the coolant flow request, wherein the pump circulates coolant through a radiator of the charge air cooler and through the heat exchanger of the charge air cooler when the pump is activated, and the heat exchanger is disposed upstream of an intake manifold of an engine.

2. The system of claim 1 further comprising a minimum coolant flow module configured to determine a minimum coolant flow through the heat exchanger that prevents coolant boiling, wherein the coolant flow request module is configured to set the coolant flow request equal to the minimum coolant flow when the coolant flow request is less than the minimum coolant flow.

3. The system of claim 2 wherein the minimum coolant flow module is configured to determine the minimum coolant flow based on the outlet temperature of the compressor and a total mass flow rate of air and recirculated exhaust gas entering the compressor.

4. The system of claim 2 further comprising a maximum coolant flow module configured to determine a maximum coolant flow that avoids condensation in the charge air cooler, wherein the coolant flow request module is configured to set the coolant flow request equal to the maximum coolant flow when the coolant flow request is greater than the maximum coolant flow.

5. The system of claim 4 wherein the maximum coolant flow module is configured to determine the maximum coolant flow based on the maximum efficiency of the charge air cooler and a total mass flow rate of air and recirculated exhaust gas entering the compressor.

6. The system of claim 5 wherein the CAC efficiency module is configured to determine the maximum efficiency of the charge air cooler based on the outlet temperature of the compressor, an inlet specific humidity of the compressor, a boost pressure provided by the compressor, and an outside air temperature.

7. A system comprising:
a coolant flow request module configured to determine a coolant flow request based on at least one of:
an outlet temperature of a compressor disposed upstream of a heat exchanger of a charge air cooler; and
an efficiency of a radiator of the charge air cooler;
a pump control module configured to control an output of a pump based on the coolant flow request, wherein the pump circulates coolant through the radiator of the charge air cooler and through the heat exchanger of the charge air cooler when the pump is activated, and the heat exchanger is disposed upstream of an intake manifold of an engine;
a minimum coolant flow module configured to determine a minimum coolant flow through the heat exchanger that prevents coolant boiling; and
a maximum coolant flow module configured to determine a maximum coolant flow that avoids condensation in the charge air cooler, wherein the coolant flow request module is configured to:
set the coolant flow request equal to the minimum coolant flow when the coolant flow request is less than the minimum coolant flow;
set the coolant flow request equal to the maximum coolant flow when the coolant flow request is greater than the maximum coolant flow; and
set the maximum coolant flow equal to the minimum coolant flow when the minimum coolant flow is greater than the maximum coolant flow.

8. The system of claim 4 wherein, before comparing the coolant flow request to the minimum and maximum coolant flows, the coolant flow request module is configured to determine the coolant flow request based on a boost pressure provided by the compressor, a total mass flow rate of air and recirculated exhaust gas entering the compressor, an ambient pressure, a temperature of the intake manifold, and an outside air temperature.

9. The system of claim 1 wherein:
the coolant flow request module is configured to selectively set the coolant flow request equal to zero when the engine is running; and
the pump control module is configured to deactivate the pump when the coolant flow request is equal to zero.

10. The system of claim 1 wherein, based on the coolant flow request, the pump control module is configured to adjust the output of the pump to one of at least three values that are greater than zero.

11. A method comprising:
determining a maximum efficiency of a charge air cooler that avoids condensation in the charge air cooler;
determining a coolant flow request based on:

an outlet temperature of a compressor disposed upstream of a heat exchanger of the charge air cooler; and the maximum efficiency of the charge air cooler; and controlling an output of a pump based on the coolant flow request, wherein the pump circulates coolant through a radiator of the charge air cooler and through the heat exchanger of the charge air cooler when the pump is activated, and the heat exchanger is disposed upstream of an intake manifold of an engine.

12. The method of claim 11 further comprising:

determining a minimum coolant flow through the heat exchanger that prevents coolant boiling; and setting the coolant flow request equal to the minimum coolant flow when the coolant flow request is less than the minimum coolant flow.

13. The method of claim 12 further comprising determining the minimum coolant flow based on the outlet temperature of the compressor and a total mass flow rate of air and recirculated exhaust gas entering the compressor.

14. The method of claim 12 further comprising:

determining a maximum coolant flow that avoids condensation in the charge air cooler; and setting the coolant flow request equal to the maximum coolant flow when the coolant flow request is greater than the maximum coolant flow.

15. The method of claim 14 further comprising determining the maximum coolant flow based on the maximum efficiency of the charge air cooler and a total mass flow rate of air and recirculated exhaust gas entering the compressor.

16. The method of claim 15 further comprising determining the maximum efficiency of the charge air cooler based on the outlet temperature of the compressor, an inlet specific humidity of the compressor, a boost pressure provided by the compressor, and an outside air temperature.

17. The method of claim 14 further comprising setting the maximum coolant flow equal to the minimum coolant flow when the minimum coolant flow is greater than the maximum coolant flow.

18. The method of claim 14 further comprising, before comparing the coolant flow request to the minimum and maximum coolant flows, determining the coolant flow request based on a boost pressure provided by the compressor, a total mass flow rate of air and recirculated exhaust gas entering the compressor, an ambient pressure, a temperature of the intake manifold, and an outside air temperature.

19. The method of claim 11 further comprising:

selectively setting the coolant flow request equal to zero when the engine is running; and deactivating the pump when the coolant flow request is equal to zero.

20. The method of claim 11 further comprising adjusting the output of the pump to one of at least three values that are greater than zero.

* * * * *